Feb. 7, 1939.   R. CHILTON   2,146,529
MAGNETO MOUNT
Filed Sept. 3, 1936
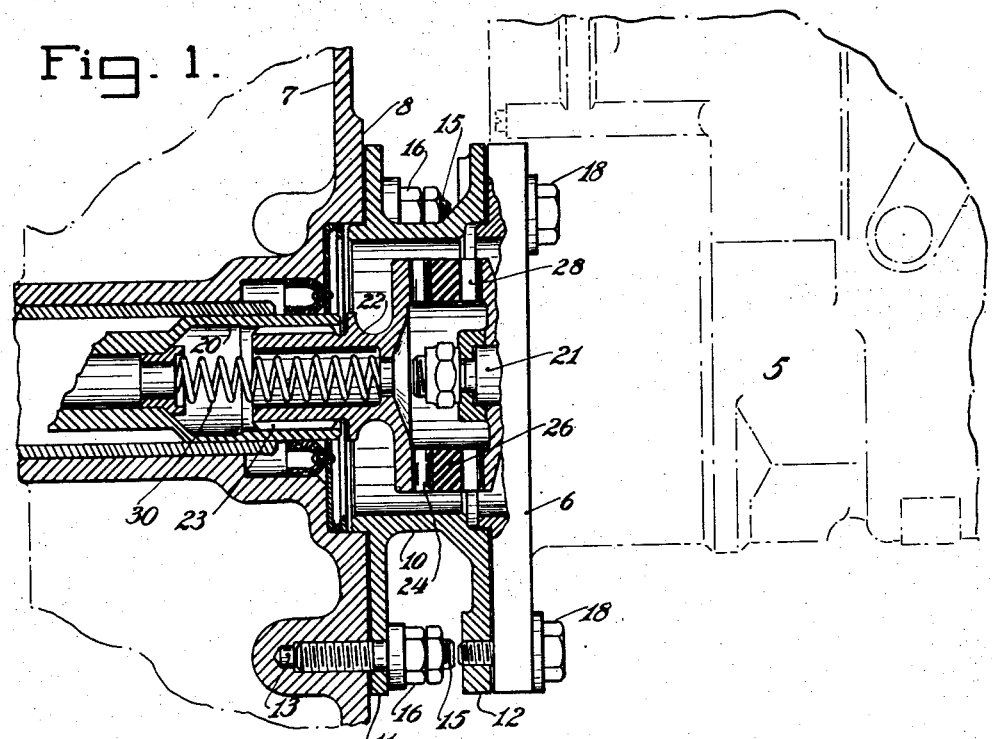
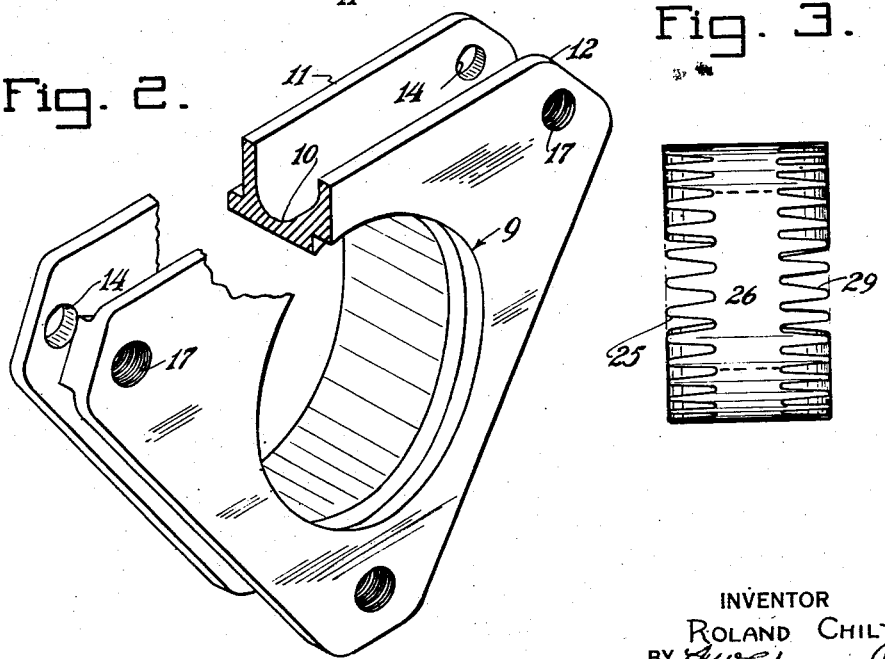
INVENTOR
ROLAND CHILTON
BY
ATTORNEY Patented Feb. 7, 1939

2,146,529

UNITED STATES PATENT OFFICE 2,146,529

MAGNETO MOUNT

Roland Chilton, Ridgewood, N. J., assignor, by mesne assignments, to Wright Aeronautical Corporation, Paterson, N. J., a corporation of New York Application September 3, 1936, Serial No. 99,212

2 Claims. (Cl. 248—15)

This invention relates to the mounting of accessories on machinery subject to vibration, and the specific preferred embodiment has been successful in overcoming vibration conditions encountered in aircraft engine magnetos.

Early types of magnetos were of the "base mounted" type, in which the engine carried a bracket having a flat face parallel to the magneto axis, the magneto being bolted at its flat face to the bracket. More recently, a flange mounting has come into use wherein the magneto is provided with a mounting flange rigid therewith which is on a plane at right angles to the axis of the shaft. The flange bolts directly to a mounting face formed on the engine and hence comprises a much more rigid connection between the engine and the magneto body than the old type bracket arrangement.

Although the internal structure of the magnetos was not changed when the flange type of mount came into use, a great many failures of the delicate internal mechanism of the magneto, due to high frequency small amplitude vibration, were experienced, and attempts to cure these troubles by changes in the internal design of the magneto were unsuccessful. The cause of the difficulty was that the mounted magneto became resonant with certain exciting frequencies of the engine whereby the amplitude and frequency of vibration became greater than the magneto mechanism could stand. The phenomenon of resonant vibration of this character may be encountered wherever a mass is supported on a structure having even a slight degree of elasticity. As the mount is made more rigid, the higher will become the frequency of vibration. This frequency, in fact, is a function of the distance which the mere weight of the mounted object will statically deflect the mounting. In the specific case of a mounted magneto, this distance is very small—on the order of 1/1000 inch, which corresponds to a natural period of vibration of the magneto on its mount of 100 cycles per second. This effect may be generalized by stating that the frequency of vibration of a mounted element is a function of the distance which the element will deflect under its own static weight. When the frequency of an exciting vibration in the engine per se synchronizes with the natural frequency of the mounted element, high amplitude movement of the element occurs through resonance of the vibrations, and unless some damping force intervenes, the mounting, or some part of the magneto or mounted element will be loosened or broken. Such resonance was encountered on certain engines having flange mounted magnetos. In the older, more flexible bracket type mountings, the natural period of vibration of the mounted magneto was outside of the normal range of exciting frequencies so that no trouble was encountered therewith.

Therefore, it appeared that the flange type of magneto mount could be rendered equivalent to the known satisfactory bracket type of mount, while still retaining its advantages, by importing into the mounting means a certain degree of flexibility. The provision of such means constitutes the prime object of the present invention.

It should be emphasized that the common conception of the term "rigid" applies to both the old time bracket mount, the present day flange type mount, and the novel flexible mount of this invention. Complete rigidity, of course, is not obtainable in any actual structure, and the changes in flexibility accomplished by this invention amount to a change in the static deflection of the mounted magneto from the order of 1/1000 inch to 2/1000 inch, which change is sufficient to bring the natural period out of synchronism with exciting engine vibrations. Actual tests on the mounting of this invention show that the objective of destroying the possibility of resonance has been in practice achieved, the loosening and chafing of the magneto parts, characteristic of the directly applied flange mounting, having disappeared with the mounting of this invention.

I am aware that rubber mountings of very much greater flexibility, and having a relatively high damping tendency, are in general use. However, for the purpose here intended, such rubber or cushion mountings are undesirable, since they permit of too much relative movement of the magneto with respect to the engine which may upset timing and alignment requirements under engine operating conditions.

Reference may be made to the annexed specification and claims, and to the accompanying drawing, in which similar numbers indicate similar parts, and in which:

Fig. 1 is an axial section through part of an engine accessory and engine, with the mounting of the invention interposed in operative position;

Fig. 2 is a perspective view of the mounting unit, partly in section, and

Fig. 3 is an elevation of the cushion element in the rotational drive.

The magneto, indicated as 5, is provided with a conventional mounting flange 6. The engine 7 is provided with a mounting face, on which the flange 6 is ordinarily mounted. However, I space the magneto from the engine, inserting a mount unit 9 of steel or other suitable material between the flange 6 and the face 8, this member comprising a barrel portion 10 having arms 11 and 12 integral with the barrel 10, at the ends thereof.

In the magneto shown, three mounting bolts are used, and the face 8 is correspondingly provided with tapped holes such as 13 for reception of the mounting studs. The arms 11 are drilled at 14 to receive the studs 15, and the arms 11 are clamped to the face 8 by nuts 16.

The arms 12 are provided with tapped holes 17 coaxial with the respective holes 14, and to the arms 12, the magneto is attached by cap screws 18 engaging within the holes 17.

The length and the thickness of the arms 11 and 12 are so chosen that there is some flexibility therein.

The flexibility afforded the magneto by the use of the unit 9 is of such an order that the natural vibration frequency of the mounted magneto is substantially lowered to bring it outside the range of engine vibration, but for the purposes of magneto functioning, it may be considered as rigid, whereby proper timing relationships are retained and the magneto is subject to only very small actual deflections so far as its movement relative to the engine is concerned.

The barrel 10 provides an axial spacing between the normal internally splined driving element 20 of the engine 7 and the driven shaft 21 of the magneto 5. This axial spacing is used to good advantage by inserting between the elements 20 and 21 a flexible coupling, comprising a member 22 having external splines 23 for engagement with the member 20, and having at its opposite end, radial serrations 24 mating with corresponding radial serrations 25 on a cushion element 26, formed of rubber or composition material. The magneto shaft 21 carries a hub member 27 having radial serrations 28 similar to those mentioned, which engage against radial serrations 29 formed at the magneto end of the cushion element 26.

Since the spline connection 20, 23 is axially slidable, a spring 30 is utilized to press the member 22 toward the magneto, whereby the several driving faces of the cushion element 26 and associated parts are kept in firm driving engagement.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with an engine and an accessory having normally abutted mounting faces of a frequency reducing mounting member comprising arms secured rigidly at their respective extremities to respective faces and a barrel portion from which said arms extend, so as to somewhat reduce the rigidity of the mounting.

2. In combination with an engine and a magneto having companion flanges for bolting the magneto to the engine, a mounting drum having arms extending therefrom at each end for rigid securement to the respective members by said bolts, said arms serving to reduce the mounting rigidity as compared to that obtained when the faces are directly bolted together.

ROLAND CHILTON.